March 22, 1955  E. B. HAMMOND, JR  2,704,490
FIRE CONTROL SYSTEM FOR AIRCRAFT GUNS
Filed June 16, 1943  3 Sheets-Sheet 1

INVENTOR
EDMUND B. HAMMOND JR
BY
Herbert H. Thompson
his ATTORNEY

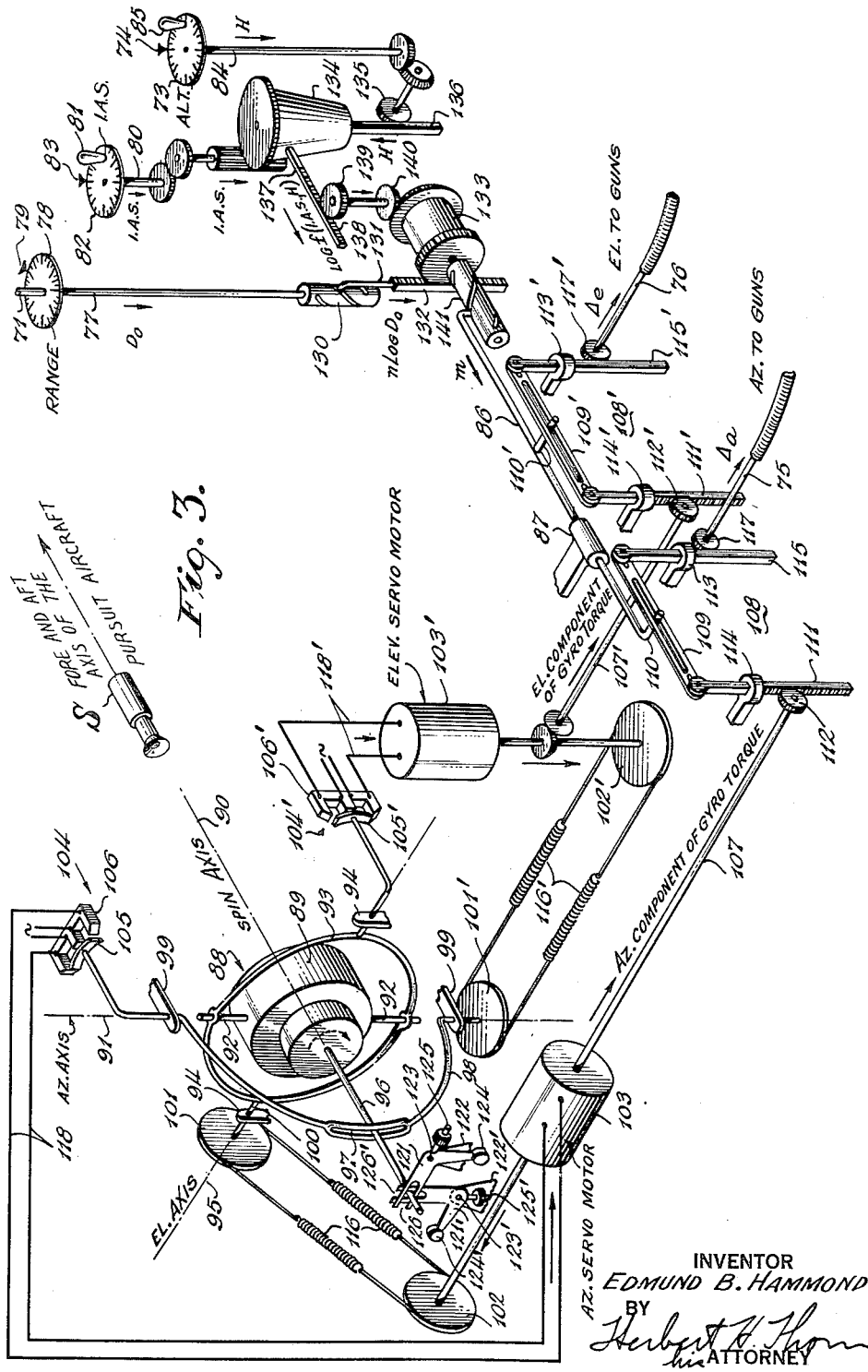

March 22, 1955     E. B. HAMMOND, JR     2,704,490
FIRE CONTROL SYSTEM FOR AIRCRAFT GUNS
Filed June 16, 1943     3 Sheets—Sheet 3
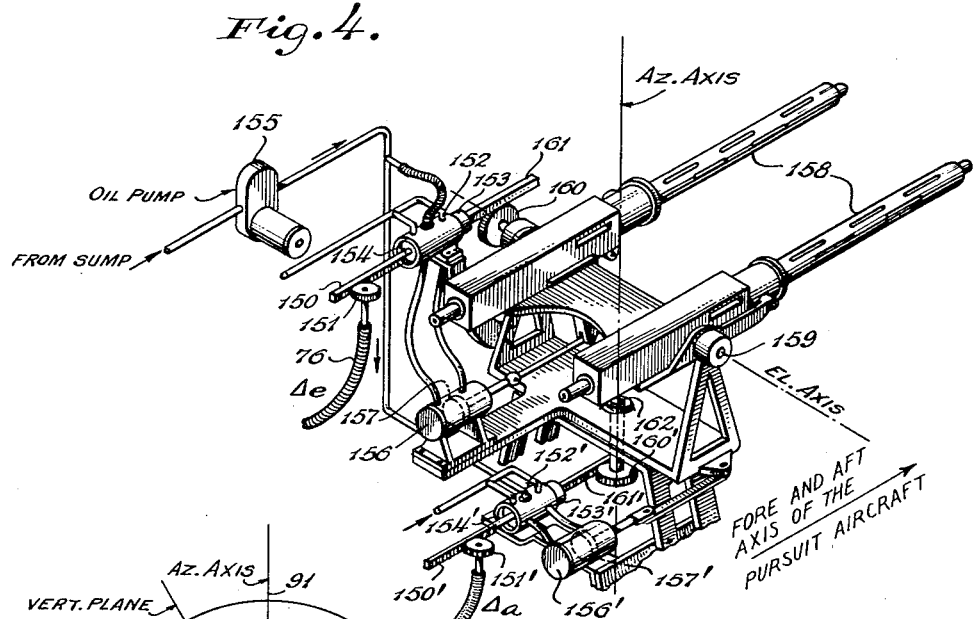
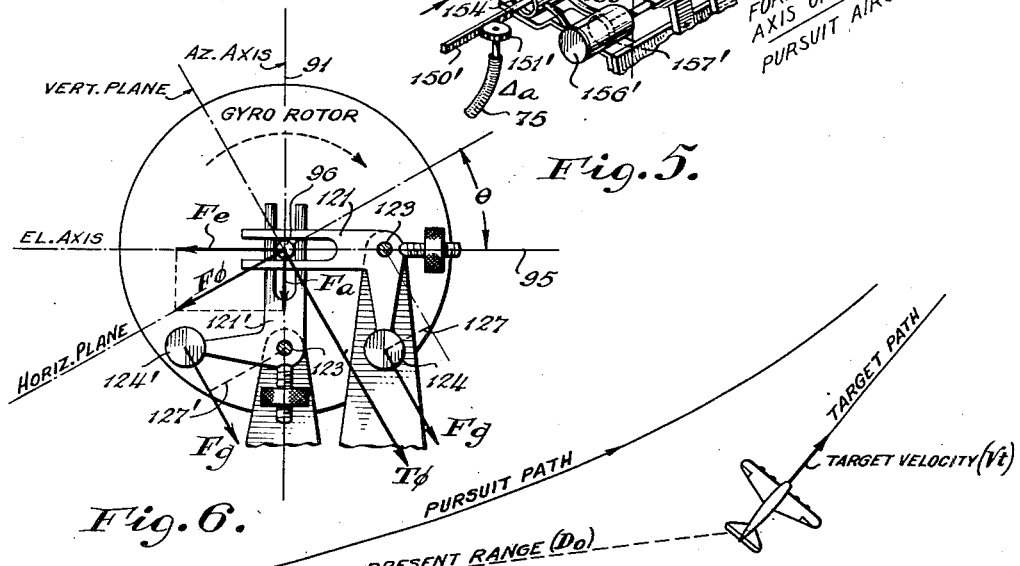
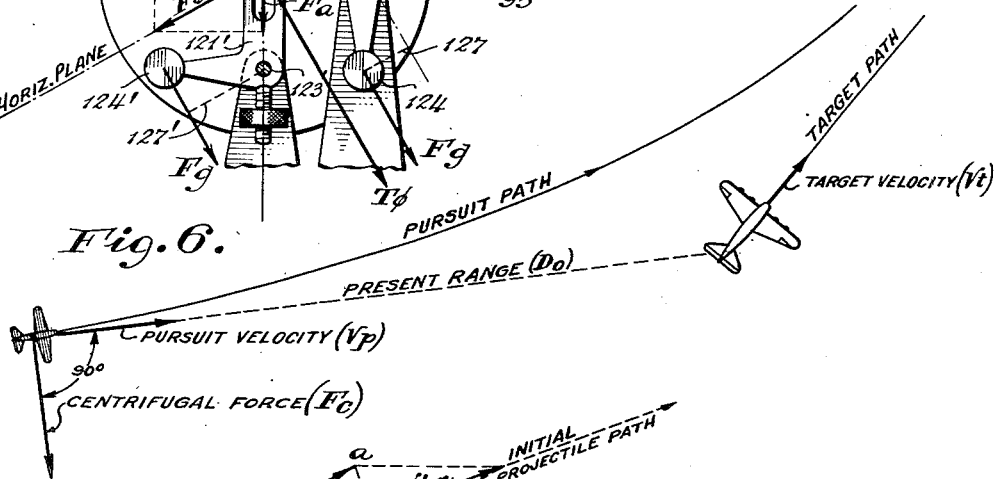
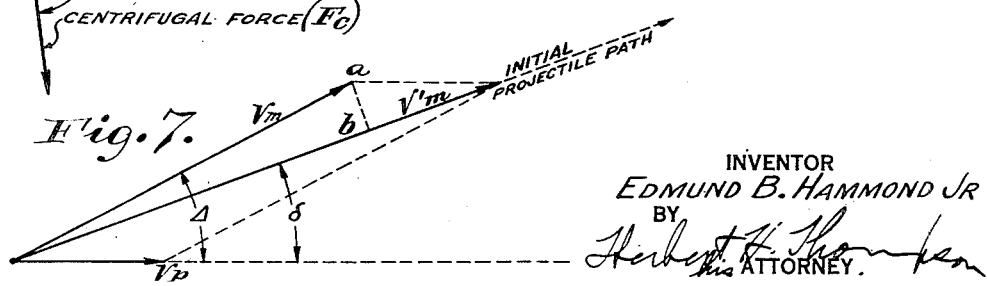
INVENTOR
EDMUND B. HAMMOND JR
BY
*Herbert H. Thompson*
ATTORNEY.

United States Patent Office 2,704,490
Patented Mar. 22, 1955

2,704,490
FIRE CONTROL SYSTEM FOR AIRCRAFT GUNS

Edmund B. Hammond, Jr., Brooklyn, N. Y., assignor to The Sperry Corporation, a corporation of Delaware Application June 16, 1943, Serial No. 490,975

28 Claims. (Cl. 89—41)

This invention relates generally to the art of aircraft fire control and more particularly to a combination automatic pilot and fire control system especially adapted for use on attack, pursuit or fighter aircraft in attacking other and usually larger aircraft. Although the target is herein indicated as another aircraft, it will be obvious that the target may be any moving or stationary object, such as a warship, tank, or gun position.

Highly refined, but extremely complicated, fire control systems are presently employed on bombers for defense against attacking aircraft. Because of the size and weight lifting capacity of such bombers, it is possible to mount thereon one or more large gun turrets which are capable of being swung through large angles of elevation and azimuth in order to direct their gunfire against the enemy. Complicated computing mechanisms are employed to compute the exact orientation of the gun turrets required in order to hit the target. In general it may be said that the bomber proceeds along its predetermined course to its destination without regard to enemy attacks, the pilot relying on the versatility and accuracy of the fire control system for protection from enemy aircraft.

On the other hand, attack, or fighter aircraft, because of inherent limitations as to space and lifting capacity, have heretofore only been provided with non-rotatable guns fixedly mounted on the craft to fire only in a direction parallel to the fore and aft axis of the craft. The fire control system has been quite simple usually comprising no more than a sight also more or less fixedly mounted on the craft and having its optical axis in substantial coincidence with the longitudinal axis of the craft, whereby the pilot may continuously maintain his craft and the guns pointed in the direction of the target. A superelevation correction is obtained by slightly offsetting the sight axis from the craft axis, the offset being manually variable in steps according to the range.

In the above described fire control system for attack aircraft, since no computation of prediction lead angle is made, it becomes necessary either for the pilot to approximate his prediction lead angle by guesswork or to maneuver his plane into such a position that the prediction lead angle is negligible. Accordingly, he must either fly his craft in dangerously close to the target in order to decrease the range and therefore the time of flight, or else he must fly his craft behind the target and in the same direction so that there is no relative angular velocity between his craft and the target. To thus "get on the target's tail" often requires a period of time amounting to several minutes during which the attacking craft is in an extremely vulnerable position.

By the present invention it is proposed to overcome these disadvantages of presently used attack aircraft fire control systems by providing guns on the attack aircraft which are movable in elevation an azimuth at least through angles comparable to the lead angles likely to be encountered in practice. A novel computing mechanism is provided in order to compute the required gun deflection angles and to offset the guns from the craft axis in elevation and azimuth by proportional amounts, thus avoiding the necessity for the pilot meeting the condition that the lead angle be negligible, and allowing him to fire quickly after sighting the target, and at a distance limited only by the range of his guns.

According to the present invention the attack aircraft is continuously flown along the line of sight to the target, that is, the craft is constantly directed at the target. Thus, the fore and aft axis of the craft is always coincident with the line of sight. In the preferred embodiment this is accomplished automatically by providing an automatic radio tracking system which controls an automatic pilot. The present invention is thus adapted to operate effectively at night time or under conditions of poor visibility.

The computing mechanism consists essentially of a gyro, the spin axis of which is automatically caused to precess at such a rate as to always remain coincident with the craft axis. The torque required to accomplish this precession thus provides a measure of the angular rate of turn of the line of sight in space. Slant range to the target, and the indicated air speed and altitude of the pursuit aircraft are also set into the computing mechanism, which is then adapted to compute from this data and from the angular rate data the azimuth and elevation components of the gun deflection angle required to hit the target. The guns are then automatically offset from the craft axis in azimuth and elevation by the amount of these computed component angles.

Thus, by providing on attack aircraft slightly movable guns controlled from the extremely simple yet accurate computing mechanism of the present invention, advantages are obtained in versatility and accuracy of gunfire out of all proportion to the disadvantages resulting from the additional weight and space requirements incident to the addition of these improvements.

Accordingly, the principal object of the present invention is to provide apparatus for, and methods of, fire control for attack type aircraft.

Another object of the invention is to provide a fire control system for attack aircraft designed to operate effectively at night or under conditions of poor visibility.

Another object of the invention is to provide an inter-aircraft fire control system adapted to operate under the condition that the course of the aircraft mounting the system is continuously maintained coincident with the line of sight to the target.

Still another object of the invention is to provide a combination automatic radio tracking, automatic fire control, and automatic pilot system for attack aircraft.

A further object of the invention is to provide a device for computing gun deflection angles for attack aircraft guns, said computation being based upon the typical curved course flown by pursuit aircraft.

A still further object of the invention is to provide a novel device for obtaining a superelevation correction in fire control systems.

Another object of the invention is to provide a novel gyroscopic arrangement for obtaining prediction angles and other component angles of the gun deflection angles in a gun fire control system.

Other objects and advantages will become apparent from the specification, taken in connection with the accompanying drawings wherein one embodiment of the invention is illustrated.

In the drawings,

Fig. 3 is a schematic perspective representation of the computing mechanism of the invention.

Fig. 4 is a perspective drawing of a typical gun mount and control means therefor.

Fig. 5 is a drawing of a detail of Fig. 3.

Fig. 6 is a drawing illustrating the typical spatial relationship existing between the attack aircraft and its target.

Fig. 7 is a diagram useful in explaining the theory of the invention.

Similar characters of reference are used in all of the above figures to indicate corresponding parts. Arrows are generally employed to indicate the direction of flow of information or control influences.

Figures 1, 2:
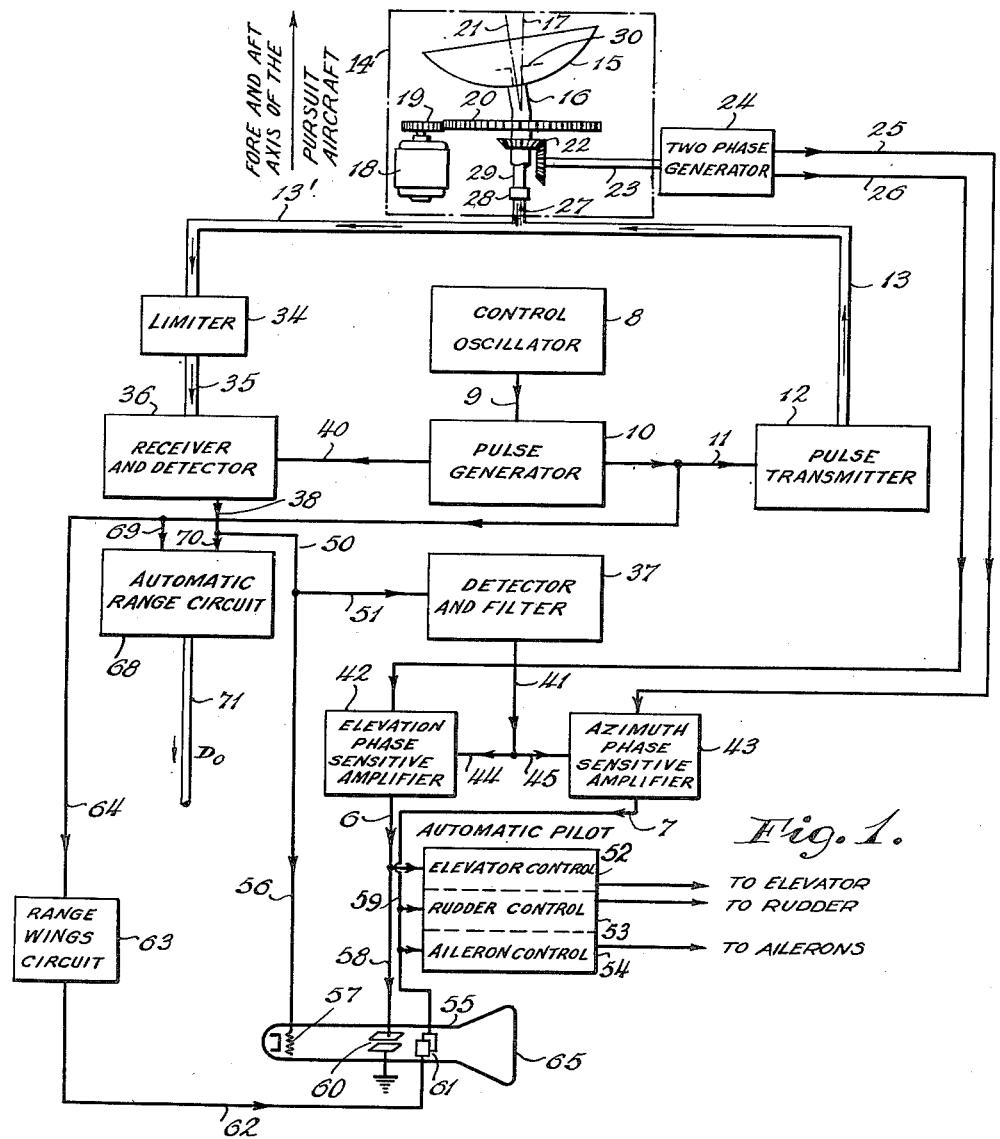
Fig. 1 is a schematic representation of the automatic radio tracking and range finding system of the invention.
Fig. 2 is a drawing of a typical presentation appearing on the face of the cathode ray tube of Fig. 1.

As previously stated the proper operation of the computing mechanism of the present invention is conditioned upon the attack aircraft always flying along the line of sight to the target. In order to meet this condition the apparatus shown in Fig. 1 is provided. This apparatus consists essentially of a radio sighting system operating to control an automatic pilot system. The radio sighting system is adapted to generate control voltage signals indicative of the angular deviation, or error, between the line of sight to the target and the fore and aft axis of the aircraft. These signals are then introduced into the elevator and rudder controls of the automatic pilot system which then operates in response to these control signal voltages to continuously realign the fore and aft axis of the attack aircraft into coincidence with the line of sight to the target.

Referring now to Fig. 1, the radio system employed for obtaining the error signal voltages is illustrated as a reflected-pulse type of ultra-high frequency system of the kind employed for tracking purposes in copending application, Serial No. 441,188, now Patent No. 2,617,982, entitled "Radio Gun Control System" and filed April 30, 1942, in the names of C. G. Holschuh et al., although any radio system adapted to define a line of sight and produce voltage signals proportionally to the elevation and azimuth components thereof, could as well be used. As described in that application, a control oscillator 8 provides a voltage of suitable synchronizing and control frequency which may be in the audio range. The output of control oscillator 8 is connected by lead 9 to a pulse generator 10 which converts the substantially sinusoidal oscillations fed to it into co-phasal pulses of any desired shape, magnitude and duration having a repetition rate equal to the frequency of oscillator 8. This device employs well known clipping, differentiating, and other suitable wave-shaping circuits in the conventional manner and consequently seems to require no further explanation.

The pulse generator 10 supplies trigger pulses to a pulse transmitter 12, as on lead 11, causing an ultra-high frequency oscillator, included within the pulse transmitter 12, to be biased on momentarily. Transmitter 12 is thus caused to produce extremely short pulses of perhaps one microsecond duration of carrier frequency which pulses are fed through wave guide 13 to a scanning radiator 14.

The scanning radiator 14 may be a simplified version of the type required in the above-mentioned Patent No. 2,617,982. The radiator described in that application is adapted to first perform a spiral scanning motion for searching purposes, and then perform a conical scanning motion for tracking purposes. The spiral scanning is accomplished by rotating the radiator about a spin axis and at the same time nodding the parabolic reflector at a slower rate about a nod axis perpendicular to the spin axis. The conical scanning is accomplished by simply stopping the nodding motion at a small angle from the zero nod position of the reflector while continuing to rotate the radiator about the spin axis. Since in the present embodiment of the invention it is only required to produce conical scanning for tracking purposes, the axis of the reflector may be permanently offset at a slight angle from the spin aixs. In this case, therefore, no mechanism is required to produce nodding motion. Although it forms no part of the present invention, any suitable type of radio searching system could be advantageously employed in conjunction with the present invention in order to locate the various enemy aircraft in the vicinity and to pick out a suitable target.

The radiator 14 is shown in Fig. 1, in simplified form in order to clarify the basic mechanism. As there shown, a parabolic reflector 15 is mounted on a horizontal supporting column 16, which column in turn is supported upon a rotatable base (not shown). Column 16 and reflector 15 are adapted to be rotated about a spin axis 17, by the fixed motor 18 operating through gearing 19 and 20. The rate of rotation of reflector 15 may be one or two hundred times slower than the frequency of control oscillator 8. Because of the bend in column 16, the axis 21 of the reflector 15 will then describe a cone about a spin axis 17, thus providing the required conical scanning. It will be understood that radiator 14 is mounted on the attack aircraft so that the spin axis 17 coincides with the longitudinal, or fore and aft, axis of the pursuit aircraft.

The rotation of column 16 and reflector 15 about the spin axis 17 is transmitted as by gearing 22 and shaft 23 to a two-phase generator 24 which is adapted to produce on its output leads 25 and 26 two 90° phase-displaced alternating current voltages, thus providing a time reference for the spin motion. In this way the instantaneous magnitude of voltage 26 is made to correspond at any time to the elevational component of the angle that the reflector axis 21 makes with the spin axis 17. Similarly, the instantaneous magnitude of voltage 25 corresponds to the azimuthal component of that angle.

The ultra-high frequency pulses, originating in pulse transmitter 12 and propagated along the wave guide 13, enter the radiator 14 through the cylindrical wave guide 27. They are then transmitted to the deflecting plate 30 through the rotating joint 28 and a second cylindrical wave guide 29 mounted concentrically within the hollow column 16. The deflecting plate 30 is adapted to interchange energy with the reflector 15, so that a fan-shaped beam of electromagnetic energy is intermittently projected into space along the axis 21 of reflector 15. Thus, as reflector 15 spins about axis 17, the electromagnetic energy is irradiated into a solid conical angle of space.

Radiator 14 serves also to receive energy reflected from remote objects during the interval between successive transmission periods. The received energy passes in reverse direction through the wave guides associated with the radiator 14. A wave guide 13', connected with the wave guide 27, conducts the received energy through a limiter 34 and wave guide 35 to a receiver and detector 36.

The limiter 34 prevents the high-powered transmitted pulses from affecting the receiver, while allowing the relatively weak received energy to pass through with little attenuation. This limiter may be of a gaseous discharge type known to the art, which consists of a gas-filled resonant chamber containing electrodes and maintained close to the ionization point. The limiter is adapted to discharge when strongly excited and thus effectively damps the exciting oscillations. The electrical length of wave guide 13' is adjusted to reflect a very high impedance at its junction with wave guide 13 when the transmitted pulses, upon attempting to pass through the limiter, discharges the resonant chamber and create substantially a short-circuit therein.

The receiver 36 amplifies and detects the received pulses in the usual manner and transmits the detected pulses to the detector and filter 37, as by leads 38, 50 and 51. To further insure that no transmitted pulse directly affect the receiver suitable blanking pulses may be furnished, as on lead 40, from the pulse generator 10 in order to bias the receiver to insensitivity for the duration of the transmitted pulses.

As more completely described in the aforesaid Patent No. 2,617,982, should an object or target be within the range of conical scanning performed by radiator 14, a reflected pulse will be received back corresponding to each transmitted pulse. Also these reflected pulses will vary in amplitude at the spin frequency, the maximum amplitude occurring at the time that the reflector axis 21 most nearly coincides with the line of sight to the target, and the amplitude of the spin frequency variation being proportional to the amount of angular deviation of the line of sight with respect to spin axis 17. Thus, the detected pulses appearing on lead 38 provide an inherent indication of the amount and direction of amount of deviation of the line of sight with respect to the spin axis 17, and therefore, with respect to the fore and aft axis of the pursuit aircraft.

The detector and filter 37 is adapted to produce on output lead 41 a spin frequency voltage corresponding to the envelope of the pulses appearing on lead 38. This spin frequency voltage is transmitted to the elevation phase sensitive amplifier 42 and the azimuth phase amplifier 43, as on leads 44 and 45, respectively.

The elevation phase sensitive amplifier 42 is adapted to compare the phase of the voltage received on lead 44 with the elevation reference voltage received on lead 26 and to produce on output lead 6 a direct voltage corresponding in polarity and magnitude to that component of the voltage appearing on lead 44 which is in phase with the reference voltage 26. In a similar manner the azimuth phase sensitive amplifier 43 produces on output lead 7 a direct voltage corresponding in polarity and magnitude to that component of the voltage appearing on lead 45 which is in phase with the azimuth reference voltage appearing on lead 25. Thus it will be seen that the voltages produced on output leads 6 and 7 correspond in polarity and magnitude to the elevation and azimuth components, respectively, of the error angle, that is, the angle that the line of sight makes with the spin axis 17, and consequently, with the fore and aft axis of the attack aircraft. These voltages, appearing on leads 6 and 7, will hereinafter be referred to as the elevation error voltage and the azimuth error voltage, respectively.

An automatic pilot system is provided having the usual elevator control 52, rudder control 53, and aileron control 54. This automatic pilot system is only schematically indicated since many such systems are well known in the art, and it is not thought necessary to show or describe the elements of their operation in detail here.

The elevation error voltage is introduced into the elevator control and the azimuth error voltage is introduced into the rudder control of the automatic pilot system. The automatic pilot system will then actuate the elevator and rudder of the attack aircraft in such a sense as to realign the fore and aft axis of the aircraft into coincidence with the line of sight to the target. When this realignment has been accomplished, the error signals will have been reduced to zero and no further change in the attitude of the craft will take place through the automatic pilot system. It will be apparent that should the line of sight change by virtue of relative angular movement between the attack aircraft and its target, error, signals will always be produced on leads 6 and 7 by the radio system above described which signals will operate through the automatic pilot system to realign the aircraft axis with the line of sight to the target. Thus we can say that the attack aircraft will always be pointed in the direction of the target.

An aileron control is provided as a conventional portion of the automatic pilot system in order to accomplish its ordinary function of normally maintaining the aircraft in level flight, and introducing the proper amount of bank during turning of the craft caused by introduction of an azimuth error signal voltage into the rudder control.

If desired, the automatic pilot system may be dispensed with and the pilot of the craft himself may maintain the craft axis coincident with the line of sight by actuating the aircraft controls in response to indications of the error angles provided for him. For this purpose a cathode ray indicator tube 55 is provided. The operation of the tube is placed under the control of the received pulses, as by lead 56, which connects the grid 57 of the tube to lead 38. It will be remembered that a voltage pulse appears on lead 38 each time a reflected pulse is received by reflector 15. The cathode ray tube 55, which is normally biased off, is biased on by the voltage pulse received on lead 56 and applied to its grid 57. Thus the electron stream is momentarily allowed to pass each time a reflected pulse is received.

The elevation and azimuth error signal voltages, which appear on leads 6 and 7, respectively, are transmitted to the cathode ray indicator tube 55, as by leads 58 and 59, and are applied to the vertical and horizontal deflecting plates 60 and 61, respectively.

In order to obtain a rough range indication there is superimposed upon the horizontal deflecting plates 61, as by lead 62, a rapidly oscillating voltage which is initiated at the time of the transmitted pulse and decreases in amplitude with time. This voltage may be obtained from a suitable "range wings" circuit 63, which is fed with pulses from the pulse generator 10, as on lead 64. A "range wings" circuit suitable for this purpose is fully described in previously mentioned copending application 441,188.

The presentation appearing on the face 65 of cathode ray indicator tube 55 is of the character shown in Fig. 2, wherein the position of the dot 66 with respect to the center of the face represents the angular orientation of the line of sight to the target with respect to the axis of the attack aircraft. The length of the "range wings" 67 caused by the oscillating voltage from the "range wings" circuit 63, being inversely proportional to the delay time between transmission and reception of corresponding pulses by reflector 15, provides an indication of the range or distance to the target, the length of these wings being inversely proportional to the range.

It will be apparent that by properly operating the aircraft controls the pilot may vary the attitude of his craft in such a manner as to bring the dot 66 representing the target to the center of the face 65 of the cathode ray tube 55. When he has done this, he will have brought the fore and aft axis of the attack craft into coincidence with the line of sight, and have accomplished the previously described function of the automatic pilot system. It should be stated that if the range wings 67 are not desired, lead 56 can be dispensed with and the electron stream can be allowed to flow at all times, thus providing a brighter dot 66.

The reflected pulse radio system is also employed to obtain an accurate measure of the slant range ($D_0$) to the target, which information is required by the computing mechanism. For this purpose an automatic range circuit 68 is provided which is provided with information as to the time of transmission of a pulse and the time of receipt of the corresponding reflected pulse, as by receiving on lead 69 the trigger pulses from pulse generator 10 which initiate the transmitted pulses, and by also receiving on lead 70 the detected received pulses from receiver and detector 36. As is well known, the lapse of time between the transmitted pulse and its corresponding received pulse is a measure of the linear distance or slant range ($D_0$) to the target. The automatic range circuit 68, which may be of the type disclosed in copending application, Serial No. 432,290, for a pulse system, filed February 25, 1942, in the name of W. M. Silhavy, or may be any other suitable type, is adapted to measure this time interval and to provide on output shaft 71 an angular displacement proportional thereto, and, therefore, also proportional to the slant range ($D_0$) to the target.

If desired, instead of employing a radio system as described to obtain indications of the angle of deviation between the aircraft heading and the line of sight to the target, a simple optical telescope (S) could be employed for these purposes. In such case, the optical telescope would be mounted on the attack aircraft so that the line of sight defined thereby is parallel to the fore and aft axis of the craft. The pilot could then fly the aircraft so as to maintain the reticle of the sight on the target, thus satisfying the condition of operation of the invention that the attack aircraft continuously fly along the line of sight to the target.

Any suitable type of range finder could be employed to obtain an angular displacement of shaft 71 proportional to the slant range ($D_0$) to the target.

In Fig. 3 there is shown the computing mechanism of the present invention which is adapted upon receipt of information as to the slant range ($D_0$) to the target, the indicated air speed (I. A. S.) of the attack aircraft, and the altitude (H) of the attack aircraft, to compute and produce as proportional angular displacements of output shafts 75 and 76 the azimuth component ($\Delta_a$) and the elevation component ($\Delta_e$), respectively, of the total gun deflection angle ($\Delta$) by which the guns must be offset from the longitudinal axis of the attack aircraft in order to hit the target. Slant range is received on shaft 77 which is driven from the slant range shaft 71 of Fig. 1. Also driven by shaft 71 is a graduated range scale 78 cooperating with a fixed index 79 whereby an accurate indication of slant range is provided. Indicated air speed is set in by the operator on shaft 80 by rotation of knob 81 and graduated scale 82 until the known indicated air speed may be read against the fixed index 83. Altitude is similarly set in on shaft 84 by rotation of knob 85 and scale 73 until the known altitude may be read against the fixed index 74. The apparatus in the upper right-hand portion of the figure is adapted, as will later be described in detail, to combine this range, indicated air speed, and altitude data in a predetermined manner and to produce therefrom, as a proportional lateral displacement of arm 86, a composite function thereof, which function will hereafter be referred to as the multiplying function ($m$). As shown, arm 86 is mounted for lateral motion in a fixed journal 87.

In the upper left-hand portion of the figure there is shown a gyroscope indicated generally at 88, having three degrees of freedom. It will be understood that a rotor (not shown) is enclosed in rotor casing 89 and is caused to spin at a high velocity about a spin axis 90 by any conventional means (not shown). As will later be explained, the operation of the gyro and the follow-up system associated therewith is such that the spin axis 90 is continuously maintained coincident with the fore and aft axis of the craft and therefore also coincident with the line of sight to the target.

The gyro is free to turn about an azimuth axis 91 by having shaft 92 which supports the gyro casing 89 pivotally mounted for rotation in gimbal ring 93. Gimbal ring 93 in turn is supported in fixed pivots 94 for rotation about an elevation axis 95. Thus, the gyro is free to turn about any of the mutually perpendicular axes 90, 91 and 95 corresponding to the longitudinal, the transverse and the normally vertical axes through the craft.

An extension 96 of the rotor casing 89 is aligned with the spin axis 90 of the gyro rotor and passes through an aperture 97 in a bale ring 98 which is pivoted about the azimuth axis 91 as by means of fixed pivots 99. Bale ring 98 is thereby adapted to exert torques or forces on the gyro rotor casing 89 about azimuth axis 91.

Fixed to supporting shaft 100 of gimbal ring 93 is a pulley 101 connected to a second pulley 102 by means of suitable loose springs 116. Pulley 102 is adapted to be angularly displaced by operation of the azimuth servomotor 103 upon receipt of a voltage signal thereby. Angular displacement of pulley 102 causes a proportional displacement of springs 116 and therefore a proportional torque on pulley 101 about elevation axis 95. This torque is transmitted to the gyro, as by shaft 100, and, in accordance with the well-known theories of operation of gyroscopes, tends to cause a precession, or rotation, of the gyro about the azimuth axis 91 at an angular velocity proportional to the torque and therefore proportional to the angular displacement of pulley 102.

The voltage signal for operation of the azimuth servomotor is obtained from pick-off 104 having an armature 105, which is actuated by the motion of spin axis 90 in azimuth, and a core member 106 fixedly mounted on the aircraft in such a manner that when spin axis 90 exactly coincides with the fore and aft axis of the aircraft, armature 105 is exactly centered symmetrically with respect to core member 106. Core member 106 is schematically indicated as being of the well-known three-legged or E type core, having a winding on its central leg energized by any suitable alternating current source and having a pair of signal pick-off or output windings on its outer legs connected in series opposition. As is well known, upon relative displacement between armature 105 and core member 106, an output signal voltage is produced across output leads 118, which voltage will have a phase sense corresponding to the sense of this relative displacement and a magnitude corresponding to the amount thereof. This output signal voltage is then employed to actuate the azimuth servomotor 103.

Considering the operation of the follow-up system in maintaining the spin axis 90 of the gyro 88 coincident with the fore and aft axis of the aircraft in azimuth, it will be seen that if these axes are originally coincident, the armature 105 will be centered with respect to core 106, and no output signal voltage will be produced on leads 118 to actuate the azimuth servomotor 103. Accordingly, pulley 102 will not be displaced at all, and no torque will be applied about elevation axis 95 to rotate the gyro about azimuth axis 91. Obviously, therefore, the spin axis will remain aligned with the longitudinal axis of the aircraft until a change of conditions occur.

Should the automatic pilot system, or the pilot himself under manual control, be required to change the azimuthal orientation of the craft heading in order to maintain it coincident with the line of sight to the target, the core member 106, being fixedly mounted on the aircraft, will initially move with respect to armature 105 which will tend to remain fixed in space along with the spin axis 90 of the gyro in accordance with the principle of gyroscopic rigidity. As a result of the unsymmetrical relationship now existing between armature 105 and core member 106, a signal voltage will be generated at pick-off 104 and will be applied to the azimuth servomotor 103 to rotate pulley 102. The angular displacement of pulley 102 produces a proportional torque on the gyro about the elevation axis 95, thus causing precession of spin axis 90 about the azimuth axis 91 at a rate proportional to the angular displacement of pulley 102 and in the same sense as the assumed rotation of the craft axis. Thus, armature 105 will be caused to moved in such a direction with respect to core member 106 as to tend to re-establish a symmetrical relationship between these two members. As long as an unsymmetrical relationship exists, a signal will continuously be applied to the azimuth servomotor which will thereby increase the angular displacement of pulley 102, causing the rate of precession to continuously increase until such time as the armature 105 overtakes the core member 106. It will be apparent, therefore, that the operation of the follow-up system is such that a symmetrical relationship between armature 105 and core member 106 is always sought, and by making the pick-off 104 very sensitive and the whole follow-up system very quick-acting, it may be said that this symmetrical relationship is always maintained. Since this symmetrical relationship between the elements of pick-off 104 corresponds to coincidence between spin axis 90 of the gyro and the fore and aft axis of the aircraft in azimuth, it may be said that the latter two axes are always maintained coincident in azimuth.

In order to maintain the spin axis 90 coincident with the fore and aft axis of the aircraft in elevation, an identical pick-off follow-up system is provided. Since the operation of the elevation system is identical with that of the azimuth system just described, the description will not be repeated. Corresponding elements of the elevation follow-up system are given the same reference numerals as those of the azimuth follow-up system except that the former are primed. In the case of the elevation follow-up system precession of the gyro about elevation axis 95 is caused by applying torques to the gyro rotor casing 89 about azimuth axis 91 through the interaction of bale ring 98 and extension 96.

Accordingly, since the spin axis 90 of the gyro is at all times maintained coincident with the fore and aft axis of the attack aircraft, and since the fore and aft axis of the aircraft is at all times maintained coincident with the line of sight to the target by the operation of the apparatus of Fig. 1, it may be said that the spin axis 90 is also continuously maintained coincident with the line of sight to the target. Also, since the angular displacements of pulleys 102 and 102' are always proportional to the rates of angular rotation of spin axis 90 about the azimuth and elevation axes, respectively, these angular displacements provide a measure of the elevation and azimuth components of the total angular rate of rotation ($\omega$) of the line of sight to the target in space. Accordingly, the angular displacement of output shaft 107, driven by azimuth servomotor 103, provides a measure of the azimuth angular rate ($\omega_a$) of the line of sight, and the angular displacement of shaft 107' similarly provides a measure of the elevation angular rate ($\omega_e$).

It should here be noted that although the gyro is in one sense spring restrained, the substantially free character of the gyro must be maintained in order for it to operate as described above. In other words, the slight deviation of the spin axis from the craft axis which must occur, for example in azimuth, in order to generate a signal indication in pick-off 104, must not be sufficient to deflect springs 116' enough to cause an appreciable torque about azimuth axis 91, since such a torque would cause a spurious precession about the elevation axis 95. This spurious precession effect is rendered negligible in the present invention firstly, by providing a very quick-acting follow-up and servo system so that the deviation of the spin axis from coincidence is never very large, and secondly, by making springs 116, 116' so as to yield with very light tension the slight deviation which does occur to deflect the springs results in practically no torque about the axis of deviation.

Variable fulcrum lever arrangements 108, 108' are provided in order to multiply the angular displacements of shafts 107, 107' by the multiplying function ($m$) to obtain the respective products as proportional angular displacements of output shafts 75 and 76. The balanced element 109 of lever arrangement 108 is pivotally supported by an extension 110 of arm 86 in such manner that the fulcrum of lever arrangement 108 is displaced from its central position by an amount proportional to the multiplying function ($m$). The input rack member 111, which is supported in fixed journal 114, is vertically displaced an amount proportional to the azimuth angular rate ($\omega_a$) from shaft 107 which actuates connecting gearing 112. This vertical displacement of member 111 is transmitted through the balanced member 109 to the output rack member 115 which is mounted for vertical displacement in the fixed journal 113. The lateral displacement of output member 115 is converted to a proportional angular displacement of the output shaft 75 as by gearing 117. For the present it will be assumed that the operation of such variable fulcrum lever arrangement is such that the displacement of the output member is exactly proportional both to the displacement of the input member and to the displacement of the fulcrum from its central position, and therefore is exactly proportional to the product of these two displacements. Accordingly the angular displacement of output shaft 75 is proportional to the product $m \cdot \omega_a$.

It can be shown that the total prediction angle ($\alpha$), which is one component of the total lead angle ($\delta$), is equal to the total angular rate ($\omega$) of the line of sight in space multiplied by the present time of flight ($T_0$) corresponding to the present slant range ($D_0$) to the target, that is, $\alpha = T_0 \omega$. Since the prediction angle ($\alpha$) is small, it may be considered as being a vector and as comprising azimuth and elevation component vectors according to the following equation:

$$\vec{\alpha} = \vec{T_0 \omega} = \vec{\alpha_a} + \vec{\alpha_e} = \vec{T_0 \omega_a} + \vec{T_0 \omega_e}$$

If for the present we consider that the multiplying function ($m$) is made equal to the present time of flight ($T_0$), it will be seen that the angular displacement of shaft 75, being proportional to the product of the angular displacement of shaft 107 and the lateral displacement of arm 86, will be proportional to the product $T_0 \omega_a$ and will therefore be proportional to the azimuth component ($\alpha_a$) of the total prediction angle ($\alpha$). In a similar manner of the variable fulcrum lever arrangement 108' would operate to multiply the elevation angular rate ($\omega_e$) appearing as a proportional rotation of shaft 107' by the present time of flight ($T_0$), which under our assumed conditions appears as a proportional lateral displacement of arm 86, to produce the elevation component ($\alpha_e = T_0 \omega_e$) of the total prediction angle ($\alpha$) as an angular displacement of output shaft 76. Accordingly, were the guns to be offset in azimuth and elevation from the craft axis in accordance with the angular displacements of shafts 75 and 76, respectively, the total angular deflection of the guns would be as follows:

$$\text{Total gun deflection angle} = \vec{T_0 \omega_a} + \vec{T_0 \omega_e} = \vec{T_0 \omega} = \vec{\alpha}$$

In order to introduce a super-elevation correction angle ($\phi$) into the gun deflection angles transmitted to the guns on shafts 75 and 76, two three-legged or T-shaped members 121 and 121' are provided. These members, both of which lie in a plane perpendicular to the spin axis 90, are pivoted upon fixed supports 122, 122' at pivots 123 and 123', which are equally displaced from the spin axis in the normally horizontal and normally vertical directions, respectively. At the end of the vertically extending leg of member 121 and at the end of the horizontally extending leg of member 121' are weighted portions 124 and 124', respectively. Weights are also attached to the second legs 125, 125' of each of these members, the weights on legs 125 and 125' being adjustably positioned with respect to pivots 123 and 123'. Slots 126 and 126' are provided at the end of the third legs of each of these members and these slots are fitted snugly over the extension 96 on gyro rotor casing 89. The purpose of the adjustable weights on legs 125, 125' is to balance the weights of the oppositely extending slotted legs, so that weights 124 and 124' only are effective in producing torques about pivots 123, 123'.

The following approximation for the super-elevation correction angle ($\phi$) can be derived:

$$\phi = K_1 T_0 \sin \gamma_0$$

wherein $\gamma_0$ is the angle between the line of sight and the zenith, and $K_1$ is a constant. In deriving this approximate expression, it is assumed that the ratio of $T_p / D_p$ is constant, wherein $T_p$ represents the future time of flight corresponding to the future slant range ($D_p$), and $D_p$ represents the linear distance from the gun to the point of impact between the target and the projectile. This ratio $T_p / D_p$ enters directly into the above relationship as a component of $K_1$.

The super-elevation angle given by the above formula lies in the vertical plane and would therefore normally have to appear as a correction only to the elevation component of the total gun deflection angle, that is, as an additional angular displacement of output shaft 76. However, it can be seen that if the plane were executing a 90° bank, the guns would have to be rotated in azimuth in order to move them in the vertical plane. In such case, therefore, this correction would have to appear as an additional angular displacement of shaft 75. In ordinary banks of the plane intermediate to these two extreme conditions, the super-elevation correction in the vertical plane would have to be inserted partially in the elevation plane and partially in the azimuth plane, and would therefore have to appear as component displacements of both shafts 75 and 76.

Referring now to Fig. 5, wherein the super-elevation weights are shown in more detail as they appear looking along the spin axis of the gyro, the manner in which these weights operate to insert the proper super-elevation correction ($\phi$) will now be explained. In Fig. 5, the general case is shown wherein the aircraft is executing a bank at some angle ($\theta$). Accordingly, the horizontal plane makes an angle ($\theta$) with the elevation axis 95 and the vertical plane makes an angle ($\theta$) with the azimuth axis 91. It will be apparent that the force of gravity ($F_g$) acting upon weights 124, 124' will produce torques about pivots 123, 123', these torques being respectively proportional to the length of lever arms 127, 127'. Since the distances from points 123, 123' to the extension 96 are equal, T-shaped members 121, 121' will exert forces ($F_a$) and ($F_e$) upon the extension 96 in directions parallel to the azimuth and elevation axis, respectively, these forces being proportional to the aforementioned torques. A simple trigonometric analysis of the angular relationships involved will disclose that the resultant force ($F\phi$) exerted upon extension 96 will always be in the horizontal plane, and the resultant torque ($T\phi$) on the gyro, corresponding to this resultant force, will therefore always be in the direction of gravity. This torque then will be in such direction as to tend to produce a precession of the gyro about a horizontal axis, or in other words, in the vertical plane.

However, as previously brought out the follow-up system previously described does not allow the gyro to precess other than by the amount required to maintain the spin axis coincident with the line of sight. Accordingly, the follow-up systems must operate to displace pulleys 102 and 102', the amounts necessary to balance the torques imposed on the gyro by the T-shaped members 121, 121'. The resulting additional displacement of shafts 107, 107' will be multiplied as before by the multiplying function ($m$), which it will still be assumed to be proportional to present time of flight ($T_0$), thus causing additional displacements of shafts 75 and 76 proportional to the respective products. Thus it will be seen that the total gun deflection angle represented by the displacements of shafts 75 and 76 will have been corrected by an additional angle, and that this angle will lie in the vertical plane since the azimuth and elevation servomotors have been additionally rotated by the respective components necessary to apply a torque to the gyro which would produce a precession in the vertical plane. This additional angle could be considered as a false prediction angle in the vertical plane.

The magnitude of this additional angle will obviously be proportional to the multiplying function ($m = T_0$) and to the resultant torque ($T\phi$) applied to the gyro by virtue of members 121, 121'. In Fig. 5, the spin axis has been shown as lying in the horizontal plane. However, this will not be the case should the aircraft be climbing or gliding. In such a case it will be apparent that the torque ($T\phi$) would be proportional to the sine of the angle ($\gamma_0$) ($T\phi$) would be proportional to the sine of the angle ($\gamma_0$) between the gyro spin axis and the zenith. Accordingly we may say that the additional angle introduced is proportional to the present time of flight ($T_0$), the sine of the angle ($\gamma_0$) between the gyro spin axis and the vertical or zenith, and the magnitude of weights 124, 124'. The expression for this additional correction angle may then be written as follows:

$$\text{correction angle} = K g T_0 \sin \gamma_0$$

wherein $K$ is a constant dependent upon the magnitude of weights 124, 124' and $g$ is the acceleration due to gravity. It is a simple matter then to choose the weights 124, 124' such that the product $Kg$ is equal to the constant $K_1$ of the previously given expression for super-elevation correction angle ($\phi$), in which case the magnitude of the additional angle introduced is equal to the correct super-elevation angle ($\phi$) as given by the previous formula, and lies in the vertical plane as required.

Thus, the total gun deflection angle which would now be represented by the component displacements of shafts 75 and 76 could be expressed as follows:

$$\text{Total gun deflection angle} = \overrightarrow{T_0\omega} + \overrightarrow{T_0K_1 \sin \gamma_0} = \vec{\alpha} + \vec{\phi}$$

In words, the total gun deflection angle would be equal to the vector sum of the prediction angle ($\alpha$) lying in the prediction plane and the super-elevation correction angle ($\phi$) lying in the vertical plane.

However, in the above discussion no account has been taken of the effect of the centrifugal force (Fc) exerted on weights 124 and 124' due to the motion of the pursuit aircraft itself, it having been assumed that only gravity acts upon the weights. The existence of this centrifugal force is clearly shown in Fig. 6, which is a plan view looking down upon the prediction plane, that is, the plane containing both the pursuit velocity vector ($V_p$) and the target velocity vector ($V_t$). As the pursuit aircraft moves along the pursuit path, the vector ($V_p$) representing its velocity obviously changes direction as the heading of the pursuit aircraft changes. This vector will rotate about an axis perpendicular to the prediction plane and will therefore produce a centrifugal force (Fc) at right angles to the pursuit velocity ($V_p$) and also lying in the prediction plane. This centrifugal force will be proportional to the centrifugal acceleration ($V_p\omega$) and will also act upon the weights 124, 124'.

It will be recalled that the effect of the gravitational force (Fc) upon the weights 124, 124' was to introduce into the total gun deflection angle represented by the component displacements of shafts 75, 76, an additional angle which lay in a plane containing the gravitational force and the spin axis. Likewise the effect of the centrifugal force (Fc) will be to introduce a second additional angle which lies in the plane containing the centrifugal force and the spin axis, which plane was previously shown to be the prediction plane. The magnitude of this second additional angle will be equal to the product of the magnitude of the acceleration ($V_p\omega$), the multiplying function ($m = T_0$), and the constant depending upon the weights $$\left(K = \frac{K_1}{g}\right)$$

Since the centrifugal force (in contrast to the gravitational force) must always be at right angles to the pursuit velocity ($V_p$), and therefore to the extension 96 of Fig. 5, the sine of this angle must always equal one, and therefore no term similar to the sin $\gamma_0$ term previously encountered need be considered. Consequently the system as outlined so far would overpredict by an angle $$\frac{K_1}{g} V_p \omega T_0$$

and the total gun deflection angle represented by the displacements of shafts 75, 76 could be expressed as follows:

$$\text{Total gun deflection angle} = \overrightarrow{T_0\omega} + \overrightarrow{T_0\omega\frac{K_1}{g}V_p\omega} + \overrightarrow{T_0K_1 \sin \gamma_0}$$

$$= \overrightarrow{T_0 w\left(1 + \frac{K_1 V_p}{g}\right)} + \overrightarrow{T_0 K_1 \sin \gamma_0}$$

In order to make the prediction component of the total gun deflection angle equal to its correct value $T_0\omega$, it will be seen that instead of making the multiplying function ($m$) equal to $T_0$, as has previously been assumed, it should be made equal to the quantity $$\frac{T_0 g}{g + K_1 V_p}$$

If this were done, the expression for the total gun deflection angle solved for and transmitted to the guns would then be:

$$\text{Total gun deflection angle} = \overrightarrow{T_0\omega} + \overrightarrow{\frac{T_0 K_1 \sin \gamma_0}{1 + \frac{K_1 V_p}{g}}}$$

Thus, our final actual solution for super-elevation correction angle is as follows:

$$\phi = \frac{T_0 K_1 \sin \gamma_0}{1 + \frac{K_1 V_p}{g}}$$

If numerical quantities are inserted in this expression for super-elevation angle, it will be found that the denominator is very nearly equal to one so that only slight error would result in any case from changing the multiplying function ($m$), as discussed above. Moreover, it will be recalled that in deriving the correct expression for the super-elevation angle ($\phi$), it was assumed that the ratio $T_p/D_p$ was constant and that this ratio directly entered the expression as a factor of the constant $K_1$. However, this ratio in fact varies in an inverse relationship with the pursuit velocity ($V_p$), since an increase in the pursuit velocity has the effect of increasing the true initial projectile velocity ($V'_m$) of the projectile so that the time ($T_p$) required for the projectile to travel a certain distance ($D_p$) is smaller. Referring now to our final actual solution for super-elevation angle ($\phi$), it will be seen that the pursuit velocity ($V_p$) enters into the expression in the denominator as it should according to the above analysis in order to compensate for the variation in $K_1$ with pursuit velocity. Accordingly, the final solution for super-elevation angle ($\phi$) actually is even better than our originally derived approximate formula.

The system as outlined so far would thus solve for the total lead angle ($\delta$) which is required between the craft axis and the true initial projectile velocity ($V'_m$), since, as we have just seen, the system solves for the vector sum of the correct prediction angle ($\alpha$) and the correct superelevation angle ($\phi$) which are the two components of the total lead angle. However, since the true initial projectile velocity ($V'_m$) is the vector sum of the actual gun muzzle velocity ($V_m$) (in the direction of the gun axis) and the pursuit velocity ($V_p$) (in the direction of the line of sight), it is still necessary to solve for the gun deflection angle ($\Delta$) at which the gun must be offset from the craft axis in order to obtain the required lead angle ($\delta$) between the true initial projectile path and the craft axis.

Fig. 7 shows the relationship between the various quantities involved. This relationship may be trigonometrically expressed as follows:

$$\sin(\Delta - \delta) = \frac{V_p \sin \delta}{V_m}$$

Since these angles are all small we may approximate their sines by their absolute values in radians. The above equation then reduces to $$\Delta = \left(\frac{V_m - V_p}{V_m}\right)\delta$$

It now can be seen that it is desirable to introduce the function $$\left[\left(\frac{V_m + V_p}{V_m}\right)\left(\frac{T_0 g}{g + K_1 V_p}\right)\right]$$

into the variable fulcrum lever arrangements as the multiplying function ($m$) instead of the function $$\left(\frac{T_0 g}{g + K_1 V_p}\right)$$

since the addition of the function $$\left(\frac{V_m + V_p}{V_m}\right)$$

is required in order to convert the total lead angle ($\gamma$) previously solved for into the total gun deflection angle ($\Delta$) desired. Assuming that this has been done, the total angle transmitted to the guns as component displacements of shafts 75 and 76 will now be equal to the true deflection angle ($\Delta$) by which the guns must be offset from the craft axis in order to hit the target, the elevation component ($\Delta_e$) of the total deflection angle being transmitted as a proportional angular displacement of shaft 76, and the azimuth component ($\Delta_a$) of the total deflection angle being transmitted as a proportional angular displacement of shaft 75.

It is now only necessary to determine the relationship between the finally evolved multiplying function ($m$) and the input variables consisting of slant range ($D_0$), indicated air speed (I. A. S.) and attitude (H). Referring back to the final expression for the multiplying function ($m$), it will be seen that all factors entering into the expression are constant except present time of flight ($T_0$) and pursuit velocity ($V_p$). Since both of these variable factors are dependent only on the known factors (I. A. S.), (H), and (D₀), it will be apparent that the multiplying function can be solved for in terms of these input variables.

It has been found most convenient to express the multiplying function in terms of the input data by the following empirical formula:

$$m = K_2 D_0^n \times f(I.A.S., H)$$

$K_2$ being a constant and the function $(f)$ being an empirically predetermined one. The above expression is employed as a basis for the apparatus of Fig. 1 which displaces arm 86 an amount proportional to the multiplying function $(m)$.

In order to accomplish this solution, shaft 77 is connected to actuate a logarithmic cam 130 which is laid out such that its follower 131 is thereby displaced an amount proportional to $n.\log D_0$. The lower portion of follower 131 is provided with rack teeth 132 which engage one input member of differential 133 to thereby rotate that member an amount proportional to $n.\log D_0$.

A three dimensional cam 134 is provided to generate the logarithm of the required function of indicated air speed and altitude. Cam 134 is rotated an amount proportional to indicated air speed (I. A. S.) by being connected to shaft 80 through a suitable gear chain, and is displaced an amount proportional to altitude (H) from shaft 84 through the interconnecting shafting and gearing including rack 135 and pinion 136. Cam 134 is so laid out that when so rotated and so displaced its follower 137 is displaced an amount proportional to the logarithm of the function $f$ (I. A. S., H) which appears in the expression for the multiplying function $(m)$. This logarithmic quantity is also introduced into the differential 133 as by rack 138 and pinion 139 and bevel gear 140 which last gear actuates the second input member of differential 133.

The output member of differential 133, which therefore has an angular displacement proportional to $$n \log D_0 + \log f (I.A.S., H)$$

is connected to drive an antilogarithmic cam 141 the lift of which is employed to displace arm 86. Cam 141 is laid out in such a manner as to produce a lift proportional to the quotient of the antilogarithm of its angular displacement divided by the factor $K_2$. Accordingly, arm 96 will be displaced an amount proportional to the required multiplying function $(m)$ in accordance with the formula above set out.

In order not to complicate the basic theory of the invention as outlined above, it has hereinbefore been assumed that the variable fulcrum lever arrangements 108, 108' were true linear multipliers, and that the input data could be multiplied by the multiplying function $(m)$ simply by offsetting fulcrums 110, 110' from their central positions by an amount directly proportional to the multiplying function. Actually, however, the relationship is not exactly linear, and in order to obtain a true multiplication by the multiplying function $(m)$ in the lever arrangements, it is necessary to displace arm 86 from its neutral position by an amount proportional to a predetermined function of $(m)$ rather than proportional to $(m)$ directly. Actually, then cam 141 is slightly modified from its previously described design so that its follower and arm 86 is actually displaced by the predetermined function of $(m)$ required in order to perform a true multiplication by the multiplying function $(m)$ in lever arrangements 108, 108'.

In Fig. 4 there is illustrated a typical gun mount which might be employed in our invention, although any gun mount adapted to provide rotation of its guns in elevation and azimuth could be used. In Figs. 3 and 4 shafts 75 and 76 are indicated as flexible shafts, at least in part, in order that the gun deflection data appearing on these shafts may be transmitted to remote gun positions. An electrical synchronous transmission system of the usual "Selsyn" or "Telegon" type with a suitable follow-up at the receiving end could be employed for this purpose instead of the flexible shafting, if desired.

A suitable hydraulic power follow-up system is provided in order to provide the torque required to actually orient the guns. Thus, considering firstly the operation in elevation, shaft 76 is connected as by rack 150 and pinion 151 to displace by an amount proportional to the gun elevation deflection angle $(\Delta_e)$ the piston 154 of a hydraulic control valve 152, the valve openings of which are dependent upon the relative displacement between its piston 154 and its cylinder 153.

An oil pump 155 is provided which supplies oil under pressure through valve 152 to a cylinder 156, the amount and direction of the oil supplied being dependent upon the relative displacement between piston 154 and cylinder 153 of valve 152. A piston 157 included within cylinder 156 is caused to be displaced by this oil flow, and this piston is rigidly connected to a portion of the mounting structure of the guns 158 to thereby cause the guns to rotate in elevation about its trunnion axis 159.

Mounted on the trunnion axis of the guns and rotating therewith is a pinion 160 engaging a rack 161 connected to cylinder 153 of valve 152. The relative movement of cylinder 153 and piston 154 thus caused by rotation of the guns in elevation is of the opposite sense to that caused by the original displacement of shaft 76 which initiated the movement of the guns. When the cylinder 153 has moved just enough to balance the original movement of piston 154 and thereby restore the valve 152 to its neutral position, the flow of oil to cylinder 156 will be cut off and no further elevation of the guns will take place. Accordingly, the guns 158 will have to be elevated by an amount proportional to the original displacement of shaft 76 and therefore by the required gun elevation deflection angle $(\Delta_e)$. In operation, of course, the sequence of operation just described takes place practically instantaneously so that the guns may be said to be always elevated in accordance with the proper gun elevation deflection angle $(\Delta_e)$ received as a proportional angular displacement of shaft 76.

Similar hydraulic control apparatus is provided to cause the guns 158 to be displaced about their azimuth axis 162 by an amount proportional to the gun azimuth deflection angle $(\Delta_a)$ received as a proportional angular displacement of shaft 75. Since the operation of the azimuth control is identical with the operation of the elevation control, it is not considered necessary to redescribe the operation. The elements of the azimuth control have been given the same reference numbers as the corresponding elements of the elevation control but are primed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A fire control system for an attack aircraft having forwardly pointed guns, comprising means for changing the direction of the fore and aft axis of said aircraft to continuously maintain said aircraft directed toward the target, means for obtaining a vector measure of the resulting angular rate of change of direction of the fore and aft axis of said aircraft in space, means for obtaining a measure of a vector lying in the vertical plane and having a magnitude equal to the sine of the angle between said axis and the zenith, and means for angularly offsetting said guns from said axis by an amount proportional to the vector sum of said two vector measures.

2. A fire control system for an attack aircraft having forwardly pointed guns, comprising means for continuously maintaining the fore and aft axis of said aircraft directed toward the target, means for obtaining a measure of the elevation and azimuth components of the angular rate of change of said axis as maintained by the first-mentioned means, means for obtaining a measure of the elevation and azimuth components of a vector lying in the vertical plane and having a magnitude equal to the sine of the angle between said axis and the zenith, and means for offsetting said guns from said axis in elevation and azimuth by angles respectively proportional to the respective sums of said elevation and azimuth components.

3. A fire control system for the forwardly pointed guns of an attack aircraft, comprising means for continuously maintaining the fore and aft axis of said aircraft aligned with the instantaneous line of sight to the target, means for obtaining a first measure of the angular rate of change of said axis in space as maintained by said first mentioned means, means for obtaining a second measure of the sine of the angle between said axis and the zenith, multiplying means for obtaining respective third and fourth measures of the respective products of said first and second measures multiplied by a composite function of the slant range to the target, the indicated air speed and the altitude of said aircraft, said third measure representing the prediction component of the gun deflection angle and said fourth measure representing the superelevation component of the gun deflection angle, and means controlled by the output of the multiplying means for angularly offsetting said guns from said axis by the vector sum of said third and fourth measures.

4. A fire control system for attack aircraft having forwardly pointed guns, comprising an automatic radio tracking system including an automatic pilot for continuously maintaining the fore and aft axis of said aircraft directed toward the target, means for obtaining a measure of the resulting angular rate of turn of the fore and aft axis of said aircraft in space, and means controlled by said means for offsetting said guns from said axis by an angle proportional to said measure of rate.

5. A fire control system, as claimed in claim 4, wherein said rate measuring means comprises a substantially free gyro, and means responsive to deviation of the spin axis of said gyro from coincidence with said axis for exerting a precessing torque upon said gyro in such a direction as to reduce said deviation to zero, said torque thereby affording said measure of rate.

6. A fire control system for an attack aircraft carrying a forwardly pointed gun mounted for limited angular movement with respect to the longitudinal axis of said aircraft, comprising an automatic radio tracking system including an automatic pilot for controlling continuously the angular motion of said aircraft in space to maintain said aircraft directed toward the target, a computing mechanism including means responsive to the resulting angular motion of said aircraft in space for obtaining a measure of the angular deviation required between the orientation of said gun and said axis for effective gunfire, and means controlled by the computing mechanism for offsetting said gun from said axis by an angle equal to said computed measure of angular deviation.

7. A fire control system for an attack aircraft carrying a forwardly pointed gun mounted for limited angular movement with respect to the longitudinal axis of said aircraft, comprising automatic means for obtaining a signal indication of the angular deviation of said axis with respect to the line of sight to the target, attitude control means for continuously aligning said axis with said line of sight by reducing said indication to zero, a computing mechanism including means responsive to the resulting angular motion of the axis of said aircraft in space for obtaining a measure of the angular deviation required between the orientation of said gun and said axis for effective gunfire, and means controlled by the computing mechanism for offsetting said gun from said axis by an angle equal to said computed measure of deviation.

8. A fire control system for an attack aircraft carrying a forwardly pointed gun mounted for limited angular movement with respect to the longitudinal axis of said aircraft, comprising a radio line of sight defining device having means for obtaining a signal indication of the angular deviation of said axis with respect to the line of sight to the target, attitude control means for continuously aligning said axis with said line of sight by reducing said indication to zero, a computing mechanism including means responsive to the resulting angular motion of the axis of said aircraft in space for obtaining a measure of the angular deviation required between the orientation of said gun and said axis for effective gunfire, and means controlled by the computing mechanism for offsetting said gun from said axis by an angle equal to said computed measure of deviation.

9. In a gun fire control system for airborne ordnance, sighting means for defining a line of sight to a target, a free gyroscope normally disposed with its spin axis in alignment with the line of sight, a system of gravity and acceleration responsive weights arranged to exert a torque upon the spin axis of said gyroscope to displace the axis for super-elevation correction, servo means responsive to any resulting deviation of said spin axis from coincidence with said line of sight for exerting a precessing torque upon the gyroscope in the direction required to reduce said deviation to zero, and a mechanism controlled by the last mentioned means for offsetting a gun from said line of sight by an angle proportional to said torque.

10. In a gun fire control system, sighting means for defining a line of sight to a target, a free gyroscope having an arm extending in the direction of its spin axis, means for continuously maintaining the spin axis of said gyroscope aligned with said line of sight, a pair of pivots, a pair of weighted members respectively mounted thereon for rotation in a plane perpendicular to said spin axis, the pivots being displaced from said spin axis in respective directions having a 90° relationship with respect to each other, said members each having slotted portions through which the arm extends, the members engaging said arm to exert torques upon said gyroscope to cause the spin axis to be precessed according to said super-elevation.

11. The method of correctly orienting the guns of the fire control system of attack aircraft for effective gunfire at a target, comprising the steps of continuously maintaining the fore and aft axis of said aircraft aligned with the instantaneous line of sight to the target, obtaining from a substantially free gyroscope measures of the azimuth and elevation components of the angular rate of change of said axis in space, applying a torque to the spin axis of the gyroscope to cause precession thereof according to the sine of the angle between said aircraft axis and the zenith, multiplying said respective measures by a predetermined composite function of the slant range to the target, the indicated air speed of said aircraft, and the altitude of said aircraft to obtain respective measures of the azimuth component angle and the elevation component angle, respectively, of the total gun deflection angle required between the gun orientation and said axis for effective gunfire, and angularly offsetting said guns from said axis by the vector sum of said component angles.

12. In a fire control system for aircraft having forwardly pointed guns, automatic means for maintaining the longitudinal axis of said aircraft directed toward a target, and a computing mechanism responsive to the resulting angular motion of said aircraft for computing the gun deflection angle at which the gun axis must be offset from the longitudinal axis of the aircraft for effective gun fire.

13. In a fire control system for a pursuit plane having forwardly pointed guns, the system being effective when the plane is flown so that its fore and aft axis is continuously directed toward the target, comprising gyroscope means for obtaining a measure of the angular rate of change of the fore and aft axis of said plane in space, and means controlled thereby for offsetting said guns from said axis by an angle proportional to said rate.

14. In a forwardly pointed fire control system for a gun of a pursuit aircraft which is flown so that its fore and aft axis is continuously directed toward a target, the gun being mounted for angular adjustment with respect to said axis of the aircraft, means for obtaining a signal which is a function of the angular rate of turn of said axis as it is continuously directed toward the target, and means controlled by the signal for offsetting said gun from the fore and aft axis of said aircraft through an angle which is a function of said rate of turn.

15. In a fire control system for a pursuit aircraft provided with a forwardly pointed gun, the system being used when the aircraft is flown so that its fore and aft axis is continuously directed toward a target, and the gun being mounted for adjustment in azimuth and elevation relative to said axis, comprising means for obtaining signals which are functions of the rates of turn of the aircraft in both azimuth and elevation as it follows the target, and means comprising servo means controlled by the signals for offsetting said gun in azimuth and elevation through angles which are respective functions of said rates of turn in azimuth and elevation.

16. A fire control system for a pursuit plane provided with forwardly pointed movable guns comprising a substantially free gyroscope, servo means for applying torques to the gyroscope to maintain the spin axis thereof parallel to the longitudinal axis of the plane, and means controlled by the servo means for offsetting the guns from the longitudinal axis of the plane in proportion to the torques applied to the gyroscope.

17. A fire control system for a pursuit plane provided with forwardly pointed guns comprising a substantially free gyroscope, servo means for applying precessing torques to the gyroscope to maintain the spin axis thereof parallel to the longitudinal axis of the plane, means controlled by the servo means for offsetting the guns from the longitudinal axis of the plane in proportion to the torques applied to the gyroscope, and means effective to modify in accordance with range the offsetting of the guns by the servo means.

18. A fire control system for a pursuit plane provided with forwardly pointed guns comprising a substantially free gyroscope, servo means for applying precessing torques to the gyroscope to maintain its spin axis parallel to the longitudinal axis of the plane, means displaced by the servo means for offsetting the guns from the longitudinal axis of the plane in accordance with the torques applied to the gyroscope, and means for modifying the displacement of said means and also of said guns in accordance with range.

19. A fire control system for a pursuit plane provided with forwardly pointed guns comprising a substantially free gyroscope, servo means for applying precessing torques to the gyroscope to maintain its spin axis parallel to the longitudinal axis of the plane, means displaced by the servo means for offsetting the guns from the longitudinal axis of the plane in accordance with the torques applied to the gyroscope, and a member displaced in accordance with range, indicated air speed and altitude effective to modify the displacement of the last mentioned means.

20. A fire control system for a pursuit plane provided with forwardly pointed guns comprising a substantially free gyroscope, servo means for applying precessing torques to the gyroscope to maintain its spin axis parallel to the longitudinal axis of the plane, azimuth and elevation levers displaced by the servo means for offsetting the guns from the longitudinal axis of the plane in accordance with the torques applied to the gyroscope, and common means for displacing the fulcrums of the levers in accordance with range, air speed and air density to correspondingly modify the positions of the guns.

21. A fire control system for a pursuit plane provided with movable forwardly directed guns, the system comprising a substantially free gyroscope, a servo system responsive to relative displacement of the gyroscope and plane for applying precessing torques about the axes of the gyroscope effective to maintain its spin axis positioned parallel with the longitudinal axis of the plane, means controlled by the servo system in accordance with the torques applied thereby to the gyroscope for adjusting the position of the guns with respect to the longitudinal axis of the plane, and means for modifying the control by the servo of the last mentioned means in accordance with range and indicated air speed.

22. A fire control system suitable for use at night by a pursuit plane provided with movable forwardly directed guns, comprising automatic radio tracking means for steering the plane so its longitudinal axis is directed continuously toward a target, a substantially free gyroscope, servo means responsive to relative angular displacement between the spin axis of the gyroscope and the longitudinal axis of the plane for applying precessing torques to the gyroscope for the purpose of maintaining its spin axis parallel to the longitudinal axis of the plane, means controlled by the servo means for offsetting the guns angularly from the longitudinal axis of the plane in accordance with the torques applied to the gyroscope, and means controlled by the radio tracking means for modifying the angular position of the guns in accordance with range.

23. A fire control system suitable for use at night by a pursuit plane provided with movable forwardly directed guns, comprising automatic radio tracking means for steering the plane so its longitudinal axis is directed continuously toward a target, a lead angle computing mechanism including a gyroscope having three degrees of freedom, servo means responsive to relative angular displacement between the spin axis of the gyroscope and the longitudinal axis of the plane effective to apply precessing torques to the gyroscope to maintain its spin axis parallel to the longitudinal axis of the plane; means displaced by the servo means for angularly positioning the guns with reference to the longitudinal axis of the plane in accordance with the torques applied to the gyroscope; means controlled by the radio tracking means for modifying the displacement of the last mentioned means in accordance with range, and further means effective to modify the angular position of the guns in accordance with altitude and the speed of the plane.

24. A fire control system suitable for use at night by a pursuit plane provided with movable forwardly directed guns, comprising an automatic radio tracking device for steering the plane so its longitudinal axis is directed continuously toward a target, a lead angle computing mechanism including a gyroscope having three degrees of freedom, servo means responsive to relative angular displacement between the spin axis of the gyroscope and the longitudinal axis of the plane effective to apply precessing torques to the gyroscope to maintain its spin axis parallel to the longitudinal axis of the plane; a pair of levers angularly displaced by the servo means in accordance with the torques applied to the gyroscope for correspondingly adjusting the angular position of the guns, a common member for adjusting the positions of the fulcrums of the levers for modifying the angular displacement of the levers, means controlled by the radio tracking device for actuating the common member according to range, and further means for modifying the position of the fulcrums in accordance with the air speed and altitude of the plane.

25. A fire control system for a gun movably mounted to fire from the front of an attack aircraft, comprising means for controlling the angular motion of the aircraft in space to maintain the longitudinal axis of the aircraft continuously directed toward the target, means for measuring the rate of angular motion of the longitudinal axis of the aircraft in space resulting from the operation of said controlling means, a computing mechanism responsive to the rate measuring means for obtaining a measure of the required angular deviation of said gun from the longitudinal axis of the aircraft for effective gunfire, and means operated by the computing means for offsetting said gun from said axis by an angle equal to said computed measure of angular deviation.

26. A fire control system for an attack aircraft having a forwardly pointed gun movable relative to the fore and aft axis of the aircraft, comprising means for defining a line of sight to the target, means controlled thereby for guiding the aircraft at variable angular rates in space so that the fore and aft axis of the aircraft is directed continuously along the line of sight to the target, means for measuring the resulting instantaneous rate of change of direction of the fore and aft axis of said aircraft, and means controlled by the rate measuring means for offsetting said gun from said axis by an angle proportional to said instantaneous rate.

27. A fire control system as claimed in claim 26, wherein said rate measuring means comprises a gyroscope having three degrees of freedom, and means responsive to deviation of the spin axis of said gyroscope from the fore and aft axis of said aircraft for exerting a precessing torque upon said gyroscope in such direction and value as to reduce and maintain said deviation substantially zero, the direction and value of said torques thereby affording said measure of instantaneous rate.

28. A fire control system for an attack aircraft having a forwardly pointed gun mounted for limited angular movement with respect to the longitudinal axis of the aircraft, comprising a radio line of sight defining device including means for obtaining electrical control signals proportional to the elevation and azimuth components of angular deviations of the longitudinal axis of the aircraft with respect to the line of sight to the target, an automatic pilot system responsive to said signals for controlling the rate of angular motion of the aircraft to continuously maintain said axis coincident with said line of sight, a computing mechanism including means responsive to the controlled rate of angular motion of said axis and means actuated in part by said rate responsive means for actuating an output member as a measure of the angular deviation required of said gun from said axis for effective gunfire, and means actuated by the output member for offsetting said gun from said axis by an angle equal to said computed measure of deviation.

References Cited in the file of this patent

UNITED STATES PATENTS

| 1,031,769 | Barr et al. | July 9, 1912 |
| 1,390,471 | Sundhaussen | Sept. 13, 1921 |

(Other references on following page)

UNITED STATES PATENTS

| | | | |
|---|---|---|---|
| 1,481,248 | Sperry | Jan. 15, | 1924 |
| 1,485,785 | Kauch | Mar. 4, | 1924 |
| 1,919,191 | Bates | July 25, | 1933 |
| 1,936,442 | Willard | Nov. 21, | 1933 |
| 2,005,530 | Boykow | June 18, | 1935 |
| 2,106,998 | Fieux | Feb. 1, | 1938 |
| 2,176,469 | Moueix | Oct. 17, | 1939 |
| 2,190,390 | Thiry | Feb. 13, | 1940 |
| 2,231,929 | Lyman | Feb. 18, | 1941 |
| 2,339,521 | Ross | Jan. 18, | 1944 |

FOREIGN PATENTS

| | | | |
|---|---|---|---|
| 248,601 | Germany | June 25, | 1912 |
| 616,248 | Germany | Aug. 1, | 1935 |
| 809,090 | France | Dec. 3, | 1936 |
| 497,147 | Great Britain | Dec. 9, | 1938 |
| 524,997 | Great Britain | Aug. 20, | 1940 |